United States Patent
Pu et al.

(10) Patent No.: US 10,287,475 B1
(45) Date of Patent: May 14, 2019

(54) SHALE INHIBITOR AND PREPARATION METHOD THEREOF, WATER-BASED DRILLING FLUID, AND SHALE GAS DRILLING AND EXTRACTION METHOD

(71) Applicant: Southwest Petroleum University, Chengdu (CN)

(72) Inventors: Xiaolin Pu, Chengdu (CN); Hao Wang, Chengdu (CN)

(73) Assignee: SOUTHWEST PETROLEUM UNIVERSITY (CN)

( * ) Notice: Subject to any disclaimer, the term of this patent is extended or adjusted under 35 U.S.C. 154(b) by 0 days.

(21) Appl. No.: 16/043,595

(22) Filed: Jul. 24, 2018

Related U.S. Application Data

(63) Continuation of application No. PCT/CN2018/086669, filed on May 14, 2018.

(51) Int. Cl.

| | | |
|---|---|---|
| *C09K 8/12* | (2006.01) | |
| *C08G 69/28* | (2006.01) | |
| *E21B 43/20* | (2006.01) | |
| *E21B 21/00* | (2006.01) | |

(52) U.S. Cl.
CPC ............... *C09K 8/12* (2013.01); *C08G 69/28* (2013.01); *E21B 21/00* (2013.01); *E21B 43/20* (2013.01); *C09K 2208/12* (2013.01)

(58) Field of Classification Search
None
See application file for complete search history.

(56) References Cited

U.S. PATENT DOCUMENTS

2004/0229755 A1* 11/2004 Thaemlitz ............... C09K 8/12
507/121

2013/0324443 A1* 12/2013 Wang .................. C04B 24/163
507/121

\* cited by examiner

*Primary Examiner* — John J Figueroa
(74) *Attorney, Agent, or Firm* — Calfee, Halter & Griswold LLP

(57) ABSTRACT

The present invention relates to the field of shale inhibitors for drilling fluids, and discloses a shale inhibitor, a method for producing the shale inhibitor, a water-based drilling fluid, and a shale gas drilling and extraction method, wherein, the shale inhibitor contains structural units A represented by formula (I), optional structural units B represented by formula (II) and structural units C represented by formula (VIII), where, n is an integer within a range of 0-3; the shale inhibitor is an amino-terminated hyperbranched polymer; the quantity ratio of the structural units A to the structural units B to the structural units C is $m:(m-1):(2m+2)$, wherein m is an integer within a range of 1-10. With the amino-terminated hyperbranched polymer inhibitor, the shale hydration inhibiting capability can be improved, and thereby the overall inhibition performance of a drilling fluid can be improved;

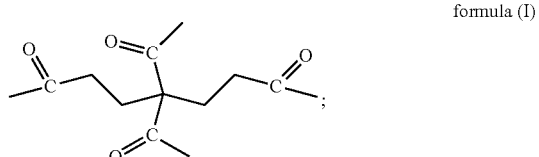

formula (I)

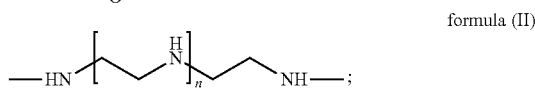

formula (II)

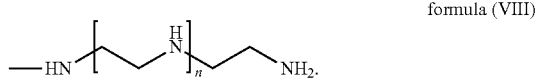

formula (VIII)

18 Claims, 2 Drawing Sheets

SHALE INHIBITOR AND PREPARATION METHOD THEREOF, WATER-BASED DRILLING FLUID, AND SHALE GAS DRILLING AND EXTRACTION METHOD

CROSS-REFERENCE TO RELATED APPLICATIONS

This application is a continuation of PCT Application No. PCT/CN2018/086669 filed on May 14, 2018, the contents of which are hereby incorporated by reference as if recited in its entirety.

FIELD OF THE INVENTION

The present invention relates to the field of inhibitors for drilling fluids, in particular to a shale inhibitor, a method for preparing the shale inhibitor, and a water-based drilling fluid that comprises the shale inhibitor.

BACKGROUND OF THE INVENTION

In recent years, as conventional oil and gas reserves are declined gradually, the exploitation and utilization of non-conventional energy resources has received more and more attention.

Among non-conventional oil and gas energy resources, shale gas, which is low-carbon and environment friendly, intensive and efficient, has receive wide attention internationally. The total reserve of shale gas in the world is $207 \times \times 10^{12}$ m$^3$, and is mainly distributed in USA, China, Middle East and North Africa regions, wherein the total reserve of shale gas in China is $31.6 \times 10^{12}$ m$^3$, and is in the first place in the world. In USA, since the energy independence initiative and shale gas revolution are carried out successfully, shale gas has been exploited industrially on a large scale, and USA has got rid of the situation of oil and gas import. The economical and green shale gas resources not only have made substantive contributions to the economic rehabilitation and growth in USA, but also have brought inspirations to the energy deployment in the countries around the world.

Shale rocks are sedimentary rocks form under multiple actions in a long time, and the composition of shale rocks is complex. In the early diagenetic stage of shale rocks, both hydration and dehydration happen; in the late diagenetic stage, dehydration mainly happens. A large quantity of clay minerals exist in shale rocks, and the crystal structure of the clay minerals mainly consists of two basic structural units, i.e., silicon-oxygen tetrahedron and aluminum-oxygen octahedron. The types of the clay minerals are determined by different stacked structures of tetrahedral layers and octahedral layers. The high-valence cations $Si^{4+}$ and $Al^{3+}$ in the crystal lattices of clay minerals are often substituted respectively by low-charge ions such as $Al^{3+}$, $Fe^{2+}$ and $Mg^{2+}$, etc., and consequently the mineral particles exhibit certain electronegativity. However, clay minerals are neutral owing to the fact that the low-valence cations such as $K^+$, $Na^+$ and $Ca^{2+}$, etc. in the strata temporarily make up for the positive charges of mineral particles under an action of attraction between positive charges and negative charges in the clay mineral formation process. Nevertheless, clay minerals exhibit their electronegativity in water because those ions may be dissociated and liberated from the clay minerals in water. The most typical clay mineral in shale gas reservoirs is montmorillonite (bentonite), which is a typical hydrated swelling mineral, mainly consists of silicon-oxygen tetrahedrons and aluminum-oxygen octahedrons, and is formed by repeatedly stacked structural units, each of which is composed of two silicon-oxygen tetrahedron layers and one intercalated aluminum-oxygen octahedron layer; the crystal layer structure is of 2:1 type, oxygen atoms exist between the structural unit layers, the bonding force between adjacent crystal layers is mainly Van der Waals force, and no hydrogen bond exists between the layers; as a result, the bonding is very weak and may be broken easily, water can enter into the spaces between the layers easily, and cation substitution and exchange may happen easily. After the cations between the crystal layers are substituted, the surfaces of the crystal layers exhibit electronegativity and therefore are mutually repulsive, encouraging external water to further enter into the space between the layers.

At present, usually oil-based drilling fluids are used in shale gas well drilling to avoid water intrusion into the shale gas formation. Though those drilling fluid systems have advantages including well wall stabilization, good lubrication property, and high temperature resistance, etc., oil-based or synthetic based drilling fluids usually involve high cost, severe contamination, and complex post-treatment in actual applications. In the meanwhile, domestic and foreign researchers have carried our extensive and successful researches and applications on high-performance water-based drilling fluid systems (e.g., amines). Most amine polymer inhibitors that have been developed up to now are in linear structures. Most linear polymers are in a state of random coils or linear structures after they are dissolved in drilling fluids, and they are absorbed to and wind on the surfaces of shale rocks in a random and non-uniform manner; there are less adsorption sites relatively, and repetitive multi-layer adsorption or zero polymer adsorption may occur locally. Besides, under the turbulent scouring action of drilling fluid, a linear inhibitor may be desorbed easily, and consequently the surfaces of shale rocks where no polymer is absorbed may still be hydrated and swell easily, finally resulting into wellbore instability or deteriorated drilling fluid properties.

Hyperbranched polymers are totally different from linear polymers in terms of structure and performance, owing to their highly branched mesh structures and a large quantity of terminal functional groups. Hyperbranched polymers are absorbed to and wind on the surfaces of shale rocks uniformly, and there are more adsorption sites relatively.

Therefore, there are certain application prospects for utilization of amino-terminated hyperbranched polymer inhibitors to improve shale hydration inhibiting capability and thereby improve overall inhibition performance of drilling fluids.

SUMMARY OF THE INVENTION

To solve the above problems in the prior art, the present invention provides a shale inhibitor, a method for preparing the shale inhibitor, a water-based drilling fluid, and a shale gas drilling and extraction method, wherein the shale inhibitor is an amino-terminated hyperbranched polymer.

To attain the objects described above, in a first aspect, the present invention provides a shale inhibitor, which comprises structural units A represented by formula (I), optional structural units B represented by (II) and structural units C represented by formula (VIII);

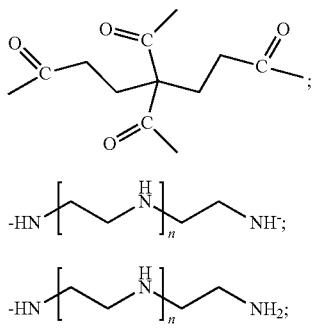

formula (I)

formula (II)

-HN$\left[\begin{array}{c}\text{H}\\\text{N}\\\end{array}\right]_n$NH⁻;

formula (VIII)

-HN$\left[\begin{array}{c}\text{H}\\\text{N}\\\end{array}\right]_n$NH$_2$;

wherein n is an integer with a range of 0-3, preferably is an integer within a range of 0-2, more preferably is 0 or 1;

wherein the shale inhibitor is an amino-terminated hyperbranched polymer that has an amido bond formed by a —CO— bond in the structural unit A bonded with an —NH— bond in the structural unit B and/or structural unit C;

wherein the quantity ratio of the structural units A to the structural units B to the structural units C is m:(m−1):(2m+2), wherein m is an integer with a range of 1-10, preferably is an integer within a range of 1-5, more preferably is 1 or 2.

In a second aspect, the present invention provides a method for preparing the above-mentioned shale inhibitor, which comprises the following steps:

(1) controlling a monomer A and a monomer B to have a Michael bis-addition reaction in an organic solvent;

(2) treating the reaction product obtained in the step (1) through first recrystallization, to obtain a product C;

(3) controlling the product C to have a polymerization reaction with a monomer D in an alcohol solvent;

wherein the monomer A has a structure represented by formula (III); the monomer B has a structure represented by formula (IV); the product C has a structure represented by formula (V); the monomer D has a structure represented by formula (VI);

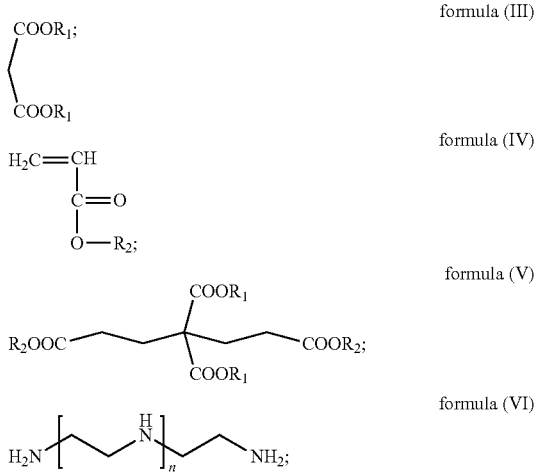

formula (III)

formula (IV)

formula (V)

formula (VI)

wherein $R_1$ and $R_2$ may be the same or different, and may be $C_1$-$C_4$ substituted or unsubstituted alkyl respectively and independently; preferably, $R_1$ is methyl or ethyl, and $R_2$ is methyl, ethyl, n-propyl, isopropyl or butyl.

In a third aspect, the present invention provides a water-based drilling fluid, which comprises the shale inhibitor provided in the present invention or the shale inhibitor prepared with the method provided in the present invention.

In a fourth aspect, the present invention provides a shale gas drilling and extraction method, which comprises performing shale gas extraction with the water-based drilling fluid provided in the present invention.

With the technical scheme described above, an amino-terminated hyperbranched polymer can be prepared with the preparation method disclosed in the present invention. The polymer has highly branched mesh structures and a large quantity of terminal functional groups, and is totally different from linear polymers in terms of structure and performance. The polymer can be absorbed to and wind on the surfaces of shale rocks uniformly, and there are more adsorption sites relatively. Utilizing the amino-terminated hyperbranched polymer as a shale inhibitor can improve shale hydration inhibiting capability and thereby improve overall inhibition performance of drilling fluids.

DETAILED DESCRIPTION OF THE EMBODIMENTS

Figure 1:
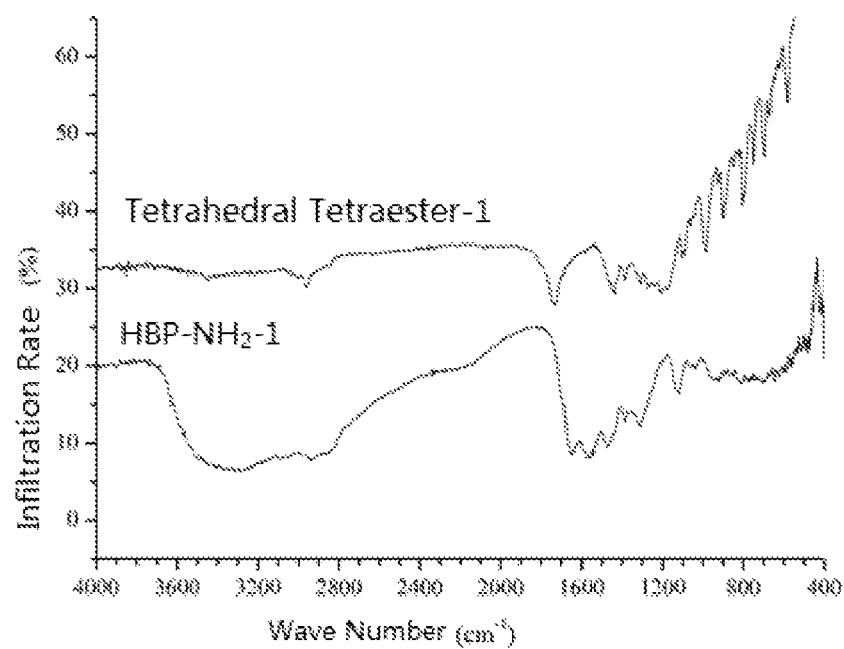
FIG. 1 shows infrared spectrograms of the product C and the inhibitor prepared in example 1.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In a first aspect, the present invention provides a shale inhibitor, which comprises structural units A represented by formula (I), optional structural units B represented by (II) and structural units C represented by formula (VIII);

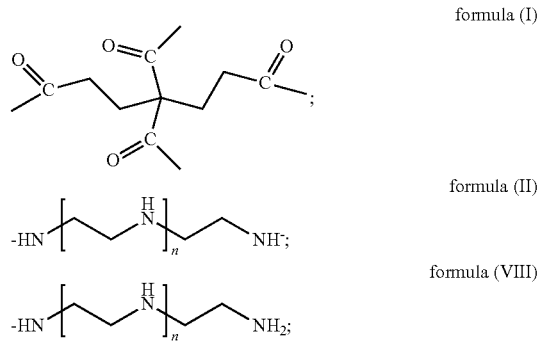

formula (I)

formula (II)

-HN$\left[\begin{array}{c}\text{H}\\\text{N}\\\end{array}\right]_n$NH⁻;

formula (VIII)

-HN$\left[\begin{array}{c}\text{H}\\\text{N}\\\end{array}\right]_n$NH$_2$;

wherein n is an integer with a range of 0-3, preferably is an integer within a range of 0-2, more preferably is 0 or 1;
wherein the shale inhibitor is an amino-terminated hyperbranched polymer that has an amido bond formed by a —CO— bond in the structural unit A bonded with an —NH— bond in the structural unit B and/or structural unit C;
wherein, the quantity ratio of the structural units A to the structural units B to the structural units C is m:(m−1):(2m+2), wherein m is an integer with a range of 1-10, preferably is an integer within a range of 1-5, more preferably is 1 or 2. In the present invention, it should be noted that the shale inhibitor may be selected from multimer structures; for example, the shale inhibitor may be selected from monomer, dimer, trimer, tetramer, pentamer, hexamer, and heptamer, etc.; preferably, the shale inhibitor is selected from monomer, dimer, trimer, tetramer, and pentamer; more preferably, the shale inhibitor is a monomer and/or dimer; in addition, the structure of the shale inhibitor may be selected from possible structures of various multimers.

According to a preferred embodiment of the present invention, the shale inhibitor may be a monomer, specifically, the shale inhibitor has a structure represented by formula (VII):

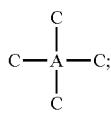

formula (VII)

wherein A is the structure represented by formula (I), C is a structure represented by formula (VIII), i.e., in the present invention, C is a structure with an amino (NH$_2$) terminal,

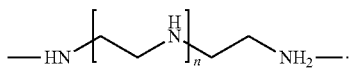

formula (VIII)

In the formula (VII), the —CO— bonds at the four terminals of the structural unit of A are bonded with the —NH— bond in the formula (VIII) respectively to form amido bonds, and thereby an amino-terminated hyperbranched polymer is formed.

According to another preferred embodiment of the present invention, the shale inhibitor may be a dimer, specifically, the shale inhibitor has a structure represented by formula (IX):

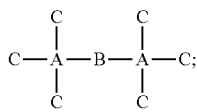

formula (IX)

wherein A is the structure represented by formula (I), B is the structure represented by formula (II), and C is the structure represented by formula (VIII), i.e., in the present invention, C is a structure with an amino (NH$_2$) terminal; A and B are connected to each other by amido bonds formed between them.

According to another preferred embodiment of the present invention, the shale inhibitor may be a trimer, specifically, the shale inhibitor has a structure represented by formula (X):

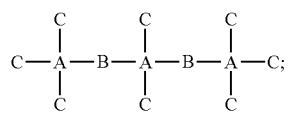

formula (X)

wherein A is the structure represented by formula (I), B is the structure represented by formula (II), and C is the structure represented by formula (VIII), i.e., in the present invention, C is a structure with an amino (NH$_2$) terminal; A and B are connected to each other by amido bonds formed between them.

According to another preferred embodiment of the present invention, the shale inhibitor may be a tetramer, wherein the tetramer may be any possible structure, preferably has a structure represented by formula (XI) or formula (XII):

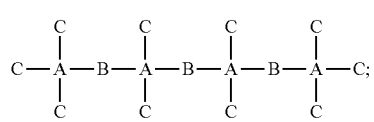

formula (XI)

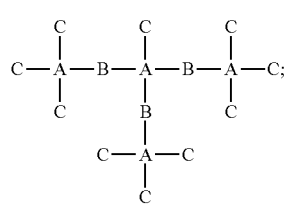

formula (XII)

wherein A is the structure represented by formula (I), B is the structure represented by formula (II), and C is the structure represented by formula (VIII), i.e., in the present invention, C is a structure with an amino (NH$_2$) terminal; A and B are connected to each other by amido bonds formed between them.

According to another preferred embodiment of the present invention, the shale inhibitor may be a pentamer, wherein the pentamer may be any possible structure, preferably has any of structures represented by formulae (XIII) to (XVI):

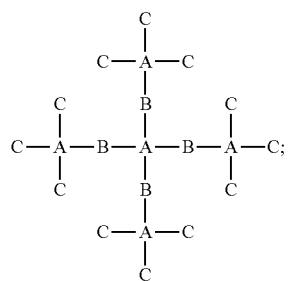

formula (XIII)

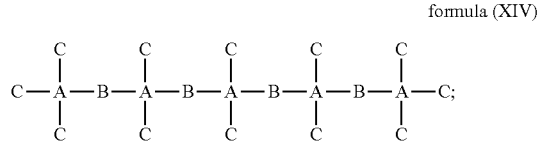

formula (XIV)

formula (XV)

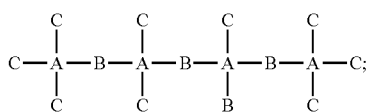

formula (XVI)

formula (V)

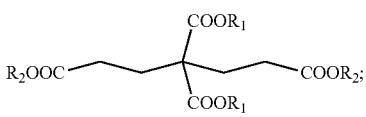

formula (VI)

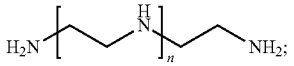

wherein A is the structure represented by formula (I), B is the structure represented by formula (II), and C is the structure represented by formula (VIII), i.e., in the present invention, C is a structure with an amino ($NH_2$) terminal; A and B are connected to each other by amido bonds formed between them.

In the present invention, it should be noted: according to other preferred embodiments of the present invention, alternatively the shale inhibitor may be a hexamer, heptamer, or octamer, etc., i.e., A and B can react repeatedly by means of the amido bond connections, and finally the ester groups in the structural units of A react with the structures represented by formula (VIII) to generate an amino-terminated hyperbranched polymer.

In the present invention, n is an integer within a range of 0-3, preferably is an integer within a range of 0-2, more preferably is 0 or 1.

In a second aspect, the present invention provides a method for preparing the above-mentioned shale inhibitor, which comprises the following steps:

(1) controlling a monomer A and a monomer B to have a Michael bis-addition reaction in an organic solvent;

(2) treating the reaction product obtained in the step (1) through first recrystallization, to obtain a product C;

(3) controlling the product C to have a polymerization reaction with a monomer D in an alcohol solvent;

wherein the monomer A has a structure represented by formula (III); the monomer B has a structure represented by formula (IV); the product C has a structure represented by formula (V); the monomer D has a structure represented by formula (VI);

formula (III)

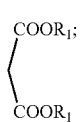

formula (IV)

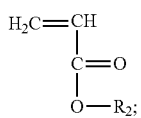

wherein n is an integer with a range of 0-3, preferably is an integer within a range of 0-2, more preferably is 0 or 1;

wherein $R_1$ and $R_2$ may be the same or different, may be H or $C_1$-$C_4$ substituted or unsubstituted alkyl respectively and independently, and may be in a linear or branched chain structure; preferably, $R_1$ is methyl or ethyl, and $R_2$ is methyl, ethyl, n-propyl, isopropyl or butyl.

Specifically, in formula (III), if $R_1$ is methyl, the monomer A is dimethyl malonate; if $R_1$ is ethyl, the monomer A is diethyl malonate.

Specifically, in formula (IV), if $R_2$ is methyl, the monomer B is methyl acrylate; if $R_2$ is ethyl, the monomer B is ethyl acrylate; if $R_2$ is n-propyl, the monomer B is propyl acrylate; if $R_2$ is isopropyl, the monomer B is isopropyl acrylate; if $R_2$ is butyl, the monomer B is butyl acrylate.

In the present invention, n is an integer within a range of 0-3; specifically, in formula (VI), if n is 0, the monomer D is ethylene diamine; if n is 1, the monomer D is diethylene triamine; if n is 2, the monomer D is triethylene tetramine; if n is 3, the monomer D is tetraethylene pentamine.

According to the present invention, the catalysts used in the Michael bis-addition reaction may be potassium carbonate and tetrabutylammonium bromide (TBAB), and the molar ratio of the potassium carbonate to the tetrabutylammonium bromide may be 1:(0.015-0.03), preferably is 1:(0.015-0.02); and the potassium carbonate preferably is anhydrous potassium carbonate.

In the present invention, the Michael bis-addition reaction is the reaction through which the product C (tetrahedral tetraester); and the reaction may be carried out under a reflux reaction condition in a conventional reaction vessel.

According to the present invention, in the step (1), the organic solvent may be selected from n-hexane, n-heptane and petroleum ether, preferably is n-hexane; besides, with respect to 100 ml organic solvent, the amount of the monomer A may be 0.1-0.3 mol, the amount of the monomer B may be 0.2-0.4 mol, and the amount of the potassium carbonate may be 0.2-0.4 mol; preferably, with respect to 100 ml organic solvent, the amount of the monomer A may be 0.1-0.2 mol, the amount of the monomer B may be 0.2-0.3 mol, and the amount of the potassium carbonate may be 0.2-0.3 mol.

According to the present invention, the monomer B may be added by dropwise adding at 0.05-0.1 ml/s rated into an organic solution of the monomer A to have the Michael bis-addition reaction, preferably is added at 0.08-0.1 ml/s rate; in the present invention, the dropwise adding rate of the monomer B is controlled to a moderate value, so that the reaction can be carried out extensively.

Preferably, the conditions of the Michael bis-addition reaction include: temperature: 50-70° C.; time: 11-13 h; more preferably, the conditions of the Michael bis-addition reaction include: temperature: 55-65° C.; time: 11.5-12.5 h.

According to the present invention, after the Michael bis-addition reaction is completed, the reaction product of the addition reaction is controlled to have first recrystallization. Preferably, before the first recrystallization, the reaction product is cooled sufficiently, filtered by suction filtration and then the filtrate is removed, and the solid that remains after the suction filtration is dissolved with ethyl acetate at 50-60° C. temperature for 10-20 min. to dissolve the reaction product obtained in the step (1), and preferably is dissolved for 15 min., then the resultant mixture is filtered by suction filtration and the solid impurity is removed, the filtrate is cooled to room temperature, and then the first recrystallization is carried out for 25-35 min., preferably for 30 min.; finally, the mixture is filtered by suction filtration to obtain the product C.

In the present invention, the polymerization reaction is the reaction through which HBP-$NH_2$ is synthesized; and the reaction may be carried out under a reflux reaction condition in a conventional reaction vessel (four-neck flask).

According to the present invention, in the step (3), the alcohol solvent is methanol, and, with respect to 100 ml alcohol solvent, the amount of the monomer D may be 0.04-0.08 mol; and the molar ratio of the product C to the monomer D may be 1:(3-5); preferably, with respect to 100 ml alcohol solvent, the amount of the monomer D is 0.04-0.06 mol; and the molar ratio of the product C to the monomer D is 1:(3-4), more preferably is 1:4. Namely, in the present invention, when the molar ratio of the product C to the monomer D is 1:4, amide in the structure represented by formula (VIII) can be generated; if the amount of the product C is excessive, the amino groups at the four terminals of the structure expressed by formula (VIII) can react with the ester groups at the four terminals of the structural unit A to generated another kind of amide that has a plurality of hyperbranched structures; if the amount of the monomer D is four times of the quantity of the tetrahedral tetraester, the reaction can be carried out extensively.

According to the present invention, the polymerization reaction comprises:

(1) adding an alcoholic solution of the product C by dropwise adding at 0.05-0.1 ml/s rate into the monomer D to have a prepolymerization reaction; and (2) treating a reaction product obtained through the prepolymerization reaction by vacuum extraction and rotary evaporation.

In the present invention, the alcoholic solution of the product C preferably is added by dropwise adding at 0.08-0.1 ml/s rate into the monomer D to have a prepolymerization reaction, and the dropwise adding rate of the monomer C is controlled to a moderate value, so that the reaction can be carried out extensively. According to the present invention, the prepolymerization reaction may be carried out under a stirring condition, there is no particular restriction on the stirring apparatus, and preferably the stirring rate is 200-240 rpm.

According to the present invention, the method further comprises treating the reaction product obtained through the prepolymerization reaction by vacuum extraction and rotary evaporation, and the rotary evaporation may be executed in an eggplant-shaped flask; preferably, the conditions of the rotary evaporation include: vacuum degree: −0.07 MPa; temperature: 70-80° C.; time: 2-4 h; more preferably, rotary evaporation is executed in an vacuum environment at −0.07 MPa vacuum degree at 60° C. temperature for 1-2 h, and then rotary evaporation is executed at 70° C. temperature for 2-3 h for drying.

According to the present invention, the method further comprises controlling the reaction product obtained through the rotary evaporation to have a polymerization reaction; preferably, the conditions of the polymerization reaction include: temperature: 40-50° C.; time: 2-5 h; more preferably, temperature: 42-48° C.; time: 3-4 h.

According to the present invention, after the polymerization reaction is completed, the product obtained through the polymerization is controlled to have second recrystallization; preferably, ethyl acetate is used for the second recrystallization; wherein the conditions of the second recrystallization include: the crude product obtained through the polymerization is dissolved with ethyl acetate at 40-50° C. temperature for 10-20 min., preferably is dissolved for 15 min., the resultant mixture is filtered in hot state by suction filtration and the solid impurity is removed, the filtrate is cooled to room temperature, and the second recrystallization is performed for 0.5-1 h.

In a third aspect, the present invention further provides a water-based drilling fluid, which comprises the shale inhibitor provided in the present invention or the shale inhibitor prepared with the method provided in the present invention.

According to the present invention, the water-based drilling fluid provided in the present invention comprises the amino-terminated hyperbranched polymer prepared with the method disclosed in the present invention as a shale inhibitor, FA-367 and SPNH as a coater for shale rock cuttings, SMP-1 as a filtrate reducer, graphite as a lubricant, and barite as a densifier.

According to the present invention, based on the total weight of the water-based drilling fluid, the amount of the amino-terminated hyperbranched polymer that serves as a shale inhibitor may be 1-5 wt %, the amount of the FA-367 that serves as a coater for shale rock cuttings may be 0.2-0.5 wt %, the amount of the SPNH may be 2-5 wt %, the amount of the SMP-1 that serves as a filtrate reducer may be 2-5 wt %, the amount of the graphite that serves as a lubricant may be 0.1-3 wt %, and the amount of the barite that serves as a densifier may be 0.1-1 wt %.

Preferably, the amount of the amino-terminated hyperbranched polymer is 2-3 wt %, the amount of the FA-367 that serves as a coater for shale rock cuttings is 0.4 wt %, the amount of the SPNH is 2.5 wt %, the amount of the SMP-1 that serves as a filtrate reducer is 1.5 wt %, the amount of the graphite that serves as a lubricant is 0.5 wt %, the amount of the barite that serves as a densifier is 0.3 wt %.

In a fourth aspect, the present invention further provides a shale gas drilling and extraction method, which comprises performing shale gas extraction with the water-based drilling fluid provided in the present invention.

Hereunder the present invention will be detailed in embodiments.

In the following embodiments and comparative examples:
The infrared spectrometer is Model Nicolet 6700 from Thermo Scientific;
The nuclear magnetic resonance spectrometer is Model Bruker AVANCE III HD 400 from Bruker;
The thermogravimetric analyzer is Model DSC 823e from Mettler Toledo;
The Zeta-potential analyzer is Model Zetaprobe from Colloidal Dynamics Co.;
The X-ray diffractometer is Model DX-2700 from Dandong Yaoyuan Instruments Co., Ltd.;
The gel permeation chromatograph is Model Alliance e2695 from Waters.
The number-average molecular weight is tested with the gel permeation chromatograph.
The filtration loss of the drilling fluid is measured with the method specified in the standard GBT16783.1-2014, i.e., the water filtration loss values of the prepared drilling fluid at 30 min. and 60 min. are measured respectively.

All chemicals involved in the embodiments and the comparative examples are purchased commercially.

Example 1

This example is provided to describe the shale inhibitor prepared with the method in the present invention.

(1) 0.1 mol (13.211 g) dimethyl malonate (132.11 g/mol) is dissolved in 40 mL n-hexane, the solution is stirred intensively for 5 min., and then 0.2 mol (27.642 g) anhydrous $K_2CO_3$ (138.21 g/mol) and 0.003 mol tetrabutylammonium bromide (about 1 g) are added into the reaction vessel respectively; 0.2 mol (17.218 g) methyl acrylate (86.09 g/mol) is added by dropwise adding at 0.1 ml/s rate into the reaction vessel to have Michael bis-addition reaction; after the dropwise adding is finished, the system is heated up to 60° C., and the mixture is held at 60° C. for 12 h for reflux reaction;

(2) after the reaction is completed and the reaction mixture cools down sufficiently, the mixture is filtered by suction filtration and the filtrate is removed, and thus pale-yellow solid is obtained; the pale-yellow solid is dissolved with ethyl acetate at 60° C. temperature for 15 min., the resultant mixture is filtered in hot state by suction filtration and the solid impurity is removed, the filtrate is cooled to room temperature, and then first recrystallization is carried out for 30 min.; thus, a product C is obtained and marked as tetrahedral tetraester-1, the mass is 24.717 g, and the yield ratio is 81.23%;

(3) 0.16 mol (16.5072 g) diethylene triamine (103.17 g/mol) is added into a four-neck flask for use later. Then 0.04 mol (12.1716 g) tetrahedral tetraester (304.29 g/mol) is dissolved in 48 mL methanol solvent; after the tetrahedral tetraester is fully dissolved, the solution is transferred to a constant-pressure dropping funnel, and the ethanol solution of tetrahedral tetraester is added by dropwise adding at 0.1 ml/s rate into the four-neck flask while it is stirred at 240 rpm stirring rate, to have a polymerization reaction; after the dropwise adding is finished, the reaction mixture is gradually heated up to 45° C. under a reflux condensation condition and is held at the temperature for 3 h for reaction;

(4) Next, the reaction mixture is transferred into an eggplant-shaped flask, the reaction mixture is evaporated by rotary evaporation at 60° C. for 1 h in a vacuum environment, and then is evaporated at 70° C. for 3 h; thus, a crude product is obtained in the eggplant-shaped flask;

(5) The crude product obtained through the polymerization is dissolved with ethyl acetate at 40-50° C. temperature for 15 min., the resultant mixture is filtered in hot state by suction filtration and the solid impurity is removed, the filtrate is cooled to room temperature, and then second recrystallization is carried out for 0.5-1 h.

Thus, 24.5691 g amino-terminated hyperbranched polymer is obtained, and is marked as HBP-$NH_2$-1, the yield ratio is 85.67%, the number-average molecular weight is 1,470 g/mol; in addition, the amino-terminated hyperbranched polymer is selected from trimer, tetramer and pentamer.

Moreover, the product C (tetrahedral tetraester-1) and the amino-terminated hyperbranched polymer HBP-$NH_2$-1 are characterized as follows:

(I) Infrared Spectroscopy

The prepared tetrahedral tetraester-1 and amino-terminated hyperbranched polymer HBP-$NH_2$-1 are analyzed by infrared spectroscopy, as shown in FIG. 1. It is seen from FIG. 1: in the infrared spectrogram of the tetrahedral tetraester-1, the wide absorption band within the range of 1,000-1,300 $cm^{-1}$ is originated from the stretching vibration of C—O—C in ester group, the peak at 1,732 $cm^{-1}$ is characterized as the C=O characteristic absorption peak of ester group, the peaks at 2,961 $cm^{-1}$ and 2,845 $cm^{-1}$ are characterized as antisymmetric stretching vibration peak and symmetrical stretching vibration peak of methylene in the tetrahedral tetraester-1; and in the infrared spectrogram of the HBP-$NH_2$-1, the characteristic absorption peaks at 3,058 $cm^{-1}$, 1,644 $cm^{-1}$ and 1,558 $cm^{-1}$ are originated from secondary amide, and the wide absorption band within the range of 3,200-3,400 $cm^{-1}$ is originated from a large quantity of primary amine functional groups at the terminals of the HBP-$NH_2$-1.

(II) Nuclear Magnetic Resonance Spectroscopy

Figure 2:
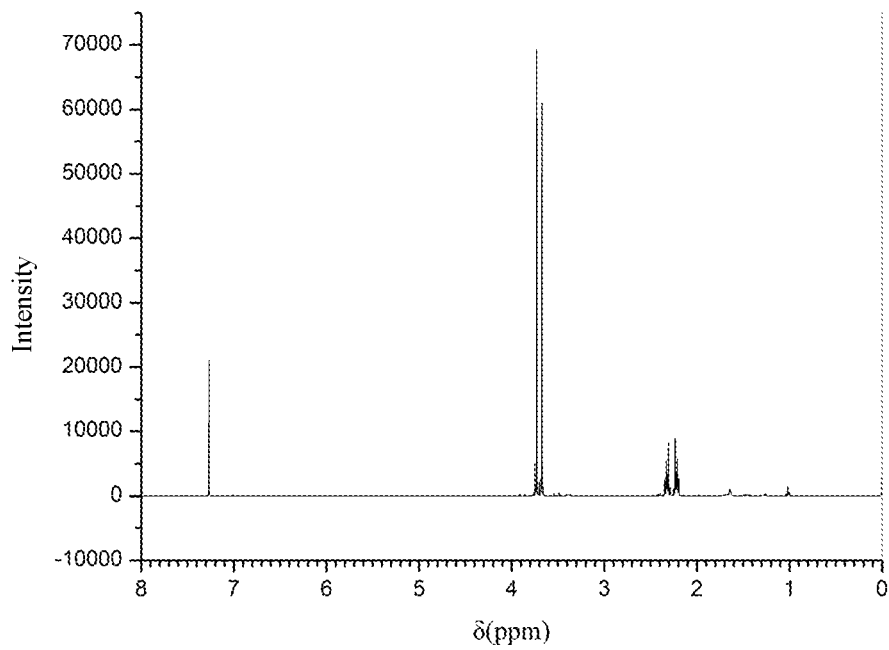
FIG. 2 shows a $^1$H-NMR spectrogram of the product C prepared in example 1.
Figure 3:
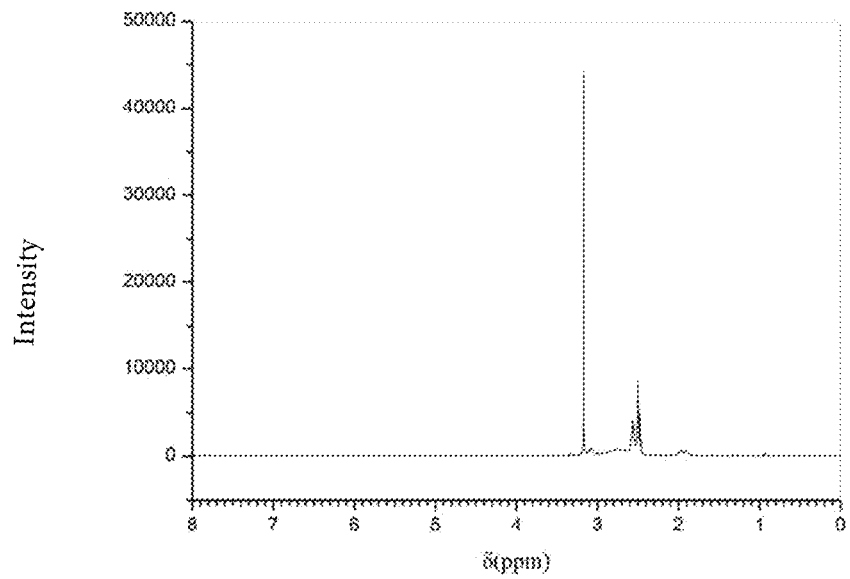
FIG. 3 shows a $^1$H-NMR spectrogram of the amino-terminated hyperbranched polymer inhibitor prepared in example 1.

The tetrahedral tetraester-1 and amino-terminated hyperbranched polymer HBP-$NH_2$-1 prepared in the example 1 are analyzed by nuclear magnetic resonance spectroscopy. As shown in FIG. 2, the two split peaks at the two sides of 3.7 ppm are originated from the two pairs of ester groups in the product C (tetrahedral tetraester-1); in the $^1$H-NMR spectrogram of the HBP-$NH_2$-1, as shown in FIG. 3, the weak chemical shift within the range of 7.8-8.2 ppm is originated from the secondary amide in the amino-terminated hyperbranched polymer, the chemical shift within the range of 1.86-2.04 ppm is originated from primary amine, and the chemical shift within the range of 2.48-2.57 ppm is originated from secondary amine.

(III) Thermogravimetric Analysis

Figure 4:
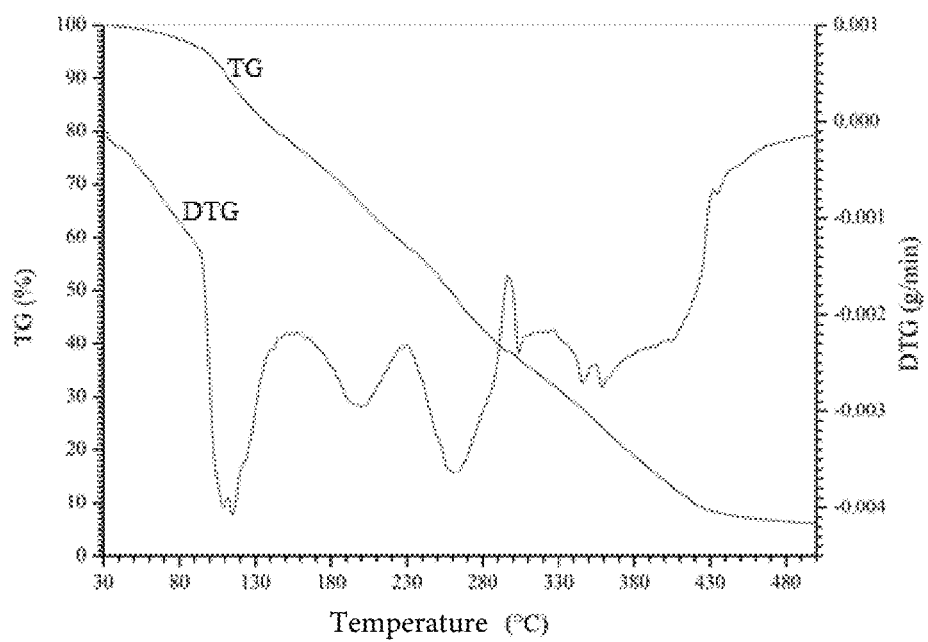
FIG. 4 shows a thermogravimetric curve of the inhibitor prepared in example 1.

The amino-terminated hyperbranched polymer HBP-$NH_2$-1 prepared in the example 1 is analyzed by thermogravimetric analysis, as shown in FIG. 4. It is seen from FIG. 4: the TG curve indicates that the HBP-$NH_2$-1 doesn't suffer severe weight loss (about 5 wt %) in 30° C.–95° C. temperature range, and the weight loss in that stage is mainly originated from some unpurified methanol and unreacted reactants; the HBP-$NH_2$-1 loses 80 wt % or more weight within 100° C.–450° C. temperature range, and the curve in that stage exhibits certain continuity and a stepped characteristic that is not obvious. That phenomenon corresponds to the polydispersity feature of the hyperbranched polymer.

Example 2

This example is provided to describe the shale inhibitor prepared with the method in the present invention.

A shale inhibitor is prepared with the method described in the example 1, except:

(1) With respect to 100 ml organic solvent, the amount of the dimethyl malonate is 0.1 mol, the amount of the methyl acrylate is 0.2 mol, the amount of the potassium carbonate is 0.2 mol, and the molar ratio of the potassium carbonate to the tetrabutylammonium bromide is 1:0.02; thus, 25.684 g compound is obtained, and marked as tetrahedral tetraester-2, the yield ratio is 84.41%;

(2) With respect to 100 ml alcohol solvent, the amount of the diethylene triamine is 0.04 mol; and the molar ratio of the product (tetrahedral tetraester-2) to the diethylene triamine is 1:3.

Thus, 6.3014 g amino-terminated hyperbranched polymer is obtained, and is marked as HBP-$NH_2$-2, the yield ratio is 87.89%, the number-average molecular weight is 1,280 g/mol; in addition, the amino-terminated hyperbranched polymer is selected from dimer, trimer and tetramer.

Example 3

This example is provided to describe the shale inhibitor prepared with the method in the present invention.

A shale inhibitor is prepared with the method described in the example 1, except:

(1) With respect to 100 ml organic solvent, the amount of the dimethyl malonate is 0.3 mol, the amount of the methyl acrylate is 0.4 mol, the amount of the potassium carbonate is 0.4 mol, and the molar ratio of the potassium carbonate to the tetrabutylammonium bromide is 1:0.03; thus, 52.1370 g compound is obtained, and marked as tetrahedral tetraester-3, the yield ratio is 85.67%;

(2) With respect to 100 ml alcohol solvent, the amount of the diethylene triamine is 0.08 mol; and the molar ratio of the product (tetrahedral tetraester-3) to the diethylene triamine is 1:5.

Thus, 9.4193 g amino-terminated hyperbranched polymer is obtained, and is marked as HBP-NH$_2$-3, the yield ratio is 82.11%, the number-average molecular weight is 1,130 g/mol; in addition, the amino-terminated hyperbranched polymer is selected from monomer, dimer and trimer.

Example 4

This example is provided to describe the shale inhibitor prepared with the method in the present invention.

A shale inhibitor is prepared with the method described in the example 1, except: the diethylene triamine is replaced with ethylene diamine, the dimethyl malonate is replaced with diethyl acrylate, and the methyl acrylate is replaced with ethyl acrylate.

thus, 29.6762 g compound is obtained, and marked as tetrahedral tetraester-4, the yield ratio is 82.34%;

thus, 19.1202 g amino-terminated hyperbranched polymer is obtained, and marked as HBP-NH$_2$-4, the yield ratio is 79.56%, the number-average molecular weight is 1,070 g/mol; in addition, the amino-terminated hyperbranched polymer is selected from monomer, dimer and trimer.

Example 5

This example is provided to describe the shale inhibitor prepared with the method in the present invention.

A shale inhibitor is prepared with the method described in the example 1, except:

(1) Methyl acrylate is added by dropwise adding at 0.08 ml/s rate into n-hexane solution of dimethyl malonate; after the dropwise adding is finished, the system is heated up to 55° C., and the mixture is held at 55° C. for 12 h for reflux reaction; thus, 23.0226 g compound is obtained, and marked as tetrahedral tetraester-5, the yield ratio is 75.66%;

(2) Ethanol solution of tetrahedral tetraester-5 is added by dropwise adding at 0.08 ml/s rate into a four-neck flask filled with diethylene triamine; after the dropwise adding is finished, the reaction mixture is heated up gradually under a reflux condensation condition to 42° C. and held at the temperature for 4 h for reaction;

thus, 23.7547 g amino-terminated hyperbranched polymer is obtained, and is marked as HBP-NH$_2$-5, the yield ratio is 82.83%, the number-average molecular weight is 1,090 g/mol; in addition, the amino-terminated hyperbranched polymer is selected from dimer, trimer and tetramer.

Test Example 1

The amino-terminated hyperbranched polymer HBP-NH$_2$-1 prepared in the example 1 is tested in a shale hot-rolling test to measure the recovery percentage, with the testing method specified in the standard SY-T6335-1997. Specifically:

50 g 6-10 mesh shale rock cuttings and 300 mL water solution in which HBP-NH$_2$-1 has been added in advance are loaded into a hot-rolling aging can, the hot-rolling aging can is loaded into a roller heater, heated up (to 120-200° C.), and hot-rolled for 16 h for aging; then the aging can is taken out, the residual rock cuttings are sieved through a 40 mesh sieve, the sieved rock cuttings are washed and dried, and the residual rock cuttings are weighed, the mass is denoted as Mr, and the hot-rolling recovery percentage of the rock cuttings is calculated with formula (1):

$$\text{Hot-Rolling Recovery Percentage} = \frac{Mr}{50 \text{ g}} \times 100\%, \quad (1)$$

The shale hot-rolling recovery percentage of the HBP-NH$_2$-1 is measured at different concentrations and different temperatures. The results are shown in Table 1.

It is seen from the data: the HBP-NH$_2$-1 improves the shale hot-rolling recovery percentage. When the concentration of HBP-NH$_2$-1 is 3%, the shale hot-rolling recovery percentage is as high as 76.85% at 120° C., which indicates the water solution in which HBP-NH$_2$-1 shale inhibitor is added at 3% concentration attains a certain inhibition effect against hydrated swelling and dispersion of shale under a long-time high-temperature aging condition; more specifically, the inhibition capability in the shale recovery test is originated from the cladding and covering effects of the primary amine groups in the HBP-NH$_2$-1, and is benefited from the dominant branch structures and a large quantity of terminal groups in the hyperbranched polymer. On a premise of the same concentration, the shale recovery percentage attained by the HBP-NH$_2$-1 is decreased as the temperature is increased from 120° C. to 200° C., owing to thermal decomposition of the HBP-NH$_2$-1. That indicates the inhibition capability of water solution in which the HBP-NH$_2$-1 shale inhibitor is added at the same concentration is decreased as the temperature is increased.

TABLE 1

| Concentration of HBP-NH$_2$-1 (wt %) | Temperature (° C.) | Hot-rolling recovery percentage (wt %) |
| --- | --- | --- |
| 0 | 120 | 28.61 |
| 2.5 | 120 | 68.73 |
| 3 | 120 | 76.85 |
| 0 | 140 | 26.26 |
| 2 | 140 | 63.56 |
| 2.5 | 140 | 68.46 |
| 3 | 140 | 75.45 |
| 0 | 160 | 20.46 |
| 2 | 160 | 57.65 |
| 2.5 | 160 | 62.73 |
| 3 | 160 | 70.68 |
| 0 | 180 | 14.46 |
| 2 | 180 | 53.22 |
| 2.5 | 180 | 58.64 |
| 3 | 180 | 64.35 |
| 0 | 200 | 14.33 |
| 2 | 200 | 46.37 |
| 2.5 | 200 | 51.63 |
| 3 | 200 | 58.67 |

Test Example 2

The amino-terminated hyperbranched polymer HBP-$NH_2$-1 prepared in the example 1 is analyzed by Zeta-potential analysis to characterize the influence of HBP-$NH_2$-1 on the Zeta-potential of bentonite base mud (4% water solution of sodium bentonite). The results are shown in Table 2.

The Zeta potential values of bentonite base muds that contain HBP-$NH_2$-1 at different concentrations (0-4%) are measured respectively at different rotation speeds (100-240 rpm); the Zeta-potential is a measure of the degree of conglomeration among bentonite particle; specifically, as the degree of dispersion of the particles is increased, the absolute value of Zeta-potential becomes higher, and the bentonite tends to dissolve or disperse, and can resist conglomeration; on the contrary, as the degree of dispersion of the particles is decreased, the absolute value of Zeta-potential becomes lower, and the bentonite tends to coagulate or conglomerate, i.e., the attractive force exceeds the repulsive force, the dispersion of the particles is inhibited, and coagulation or conglomeration of the particles happens. The amino-terminated hyperbranched polymer inhibitor is added to inhibit dispersion of bentonite particles in water and make the bentonite particles tend to conglomerate.

TABLE 2

| Concentration of HBP-$NH_2$-1 (wt %) | Rotation speed for test (rpm) | Zeta-potential (mV) |
| --- | --- | --- |
| 0 | 100 | −32.9 |
| 1 | 100 | −13.6 |
| 1.5 | 100 | −9.7 |
| 2 | 100 | −7.3 |
| 2.5 | 100 | −6.4 |
| 3 | 100 | −6 |
| 3.5 | 100 | −5.7 |
| 4 | 100 | −5.8 |
| 0 | 200 | −31.9 |
| 1 | 200 | −12.8 |
| 1.5 | 200 | −9.7 |
| 2 | 200 | −7.3 |
| 2.5 | 200 | −6.3 |
| 3 | 200 | −6 |
| 3.5 | 200 | −5.8 |
| 4 | 200 | −5.8 |
| 0 | 240 | −28.7 |
| 1 | 240 | −13.3 |
| 1.5 | 240 | −9.7 |
| 2 | 240 | −7.3 |
| 2.5 | 240 | −6.4 |
| 3 | 240 | −5.9 |
| 3.5 | 240 | −5.8 |
| 4 | 240 | −5.8 |

In the present invention, the absolute value of Zeta-potential represents the magnitude of stability, and the positive sign or negative sign represents the type of electric charge carried by the particles; it is seen from the data: at 0-1% concentration, the HBP-$NH_2$-1 causes obviously decreased Zeta-potential of the base mud, and that phenomenon proves the protonized primary amine groups in the HBP-$NH_2$-1 are extensively absorbed on the surfaces of bentonite particles by virtue of their positive charges; when the concentration of the HBP-$NH_2$-1 exceeds 1.5%, the absolute value of Zeta-potential remains at a relatively low value (5-10 mV), and the difference between the values at different rotation speeds is very low. In addition, in the present invention, when the concentration of the HBP-$NH_2$-1 is 0 wt %, the absolute value of Zeta-potential is 28.7-32.9 mV, which indicates hydrated swelling happens among the bentonite particles in the system and the degree of dispersion is relatively higher; when the concentration of the HBP-$NH_2$-1 is 1-1.5 wt %, the absolute value of Zeta-potential is 9.7-13.6 mV, which indicates the dispersion of bentonite particles in the system is inhibited; when the concentration of the HBP-$NH_2$-1 is 2-4 wt %, the absolute value of Zeta-potential is lower than 7.3 mV, which indicates rapid coagulation or conglomeration tends to happen in the system.

Test Example 3

2 g sodium bentonite is added into HBP-$NH_2$-1 shale inhibitor solutions at different concentrations to form suspensions respectively, the suspensions are stirred for 24 h at 25° C., and then are centrifuged at 5,000 rpm for 5 min., the precipitates are washed with 20 mL deionized water respectively; thus, wet bentonite samples treated with different shale inhibitors are obtained.

To study the influence of the HBP-$NH_2$-1 shale inhibitor on the spacing between sodium bentonite layers at different concentrations, the wet bentonite samples treated with the HBP-$NH_2$-1 shale inhibitor at different concentrations are scanned with an X-ray diffractometer, and thereby corresponding X-ray diffraction spectra are obtained.

The spacing $d_{001}$ between bentonite layers is calculated according to Bravais' law:

$$n\lambda = 2d \sin \theta, \quad (2);$$

wherein in formula (2), n=1 and λ=0.15406 nm.

The spacing values between bentonite crystal layers treated with the HBP-$NH_2$-1 shale inhibitor at different concentrations are shown in Table 3.

It is seen from the data in Table 3: all of the spacing values between the crystal layers of the wet bentonite samples treated with the HBP-$NH_2$-1 in different amounts are decreased to a certain degree; when the amount of the HBP-$NH_2$-1 is 3%, the spacing between the crystal layers is decreased to 1.3546 nm, which indicates that the HBP-$NH_2$-1, which has low molecular weight, can infiltrate into the spaces between the bentonite layers, displace the water between the layers, and thereby inhibit hydrated swelling of bentonite.

TABLE 3

| Concentration of HBP-$NH_2$-1 | 0 | 1 wt % | 2 wt % | 3 wt % |
| --- | --- | --- | --- | --- |
| 2θ | 4.57° | 5.88° | 6.14° | 6.52° |
| $d_{001}$ (spacing between bentonite crystal layers) | 1.9320 nm | 1.5018 nm | 1.4383 | 1.3546 nm |

Example 6

This example is provided to describe the water-based drilling fluid prepared with the method in the present invention.

The water-based drilling fluid comprises the amino-terminated hyperbranched polymer prepared in the example 1 as a shale inhibitor, FA-367 and SPNH as a coater for shale rock cuttings, SMP-1 as a filtrate reducer, graphite as a lubricant, and barite as a densifier.

In addition, based on the total weight of the water-based drilling fluid, the amount of the amino-terminated hyperbranched polymer that serves as a shale inhibitor may be 2 wt %, the amount of the FA-367 that serves as a coater for shale rock cuttings is 0.4 wt %, and the amount of the SPNH is 2.5 wt %. The amount of the SMP-1 that serves as a filtrate reducer is 1.5 wt %, the amount of the graphite that serves as a lubricant is 0.5 wt %, and the amount of the barite that serves as a densifier is 0.3 wt %.

In addition, the water-based drilling fluid Z6 prepared in the example 6 is used in shale gas extraction, and the filtrate loss is measured, as shown in Table 4.

Example 7

This example is provided to describe the water-based drilling fluid prepared with the method in the present invention.

The water-based drilling fluid comprises the amino-terminated hyperbranched polymer prepared in the example 2 as a shale inhibitor, FA-367 and SPNH as a coater for shale rock cuttings, SMP-1 as a filtrate reducer, graphite as a lubricant, and barite as a densifier.

In addition, based on the total weight of the water-based drilling fluid, the amount of the amino-terminated hyperbranched polymer that serves as a shale inhibitor may be 3 wt %, the amount of the FA-367 that serves as a coater for shale rock cuttings is 0.4 wt %, and the amount of the SPNH is 2.5 wt %. The amount of the SMP-1 that serves as a filtrate reducer is 1.5 wt %, the amount of the graphite that serves as a lubricant is 0.5 wt %, and the amount of the barite that serves as a densifier is 0.3 wt %.

In addition, the water-based drilling fluid Z7 prepared in the example 7 is used in shale gas extraction, and the filtrate loss is measured, as shown in Table 4.

Example 8

This example is provided to describe the water-based drilling fluid prepared with the method in the present invention.

The water-based drilling fluid comprises the amino-terminated hyperbranched polymer prepared in the example 3 as a shale inhibitor, FA-367 and SPNH as a coater for shale rock cuttings, SMP-1 as a filtrate reducer, graphite as a lubricant, and barite as a densifier.

In addition, based on the total weight of the water-based drilling fluid, the amount of the amino-terminated hyperbranched polymer that serves as a shale inhibitor may be 1 wt %, the amount of the FA-367 that serves as a coater for shale rock cuttings is 0.2 wt %, and the amount of the SPNH is 2 wt %. The amount of the SMP-1 that serves as a filtrate reducer is 2 wt %, the amount of the graphite that serves as a lubricant is 0.1 wt %, and the amount of the barite that serves as a densifier is 0.1 wt %.

In addition, the water-based drilling fluid Z8 prepared in the Example 8 is used in shale gas extraction, and the filtrate loss is measured, as shown in Table 4.

Example 9

This example is provided to describe the water-based drilling fluid prepared with the method in the present invention.

The water-based drilling fluid comprises the amino-terminated hyperbranched polymer prepared in the example 4 as a shale inhibitor, FA-367 and SPNH as a coater for shale rock cuttings, SMP-1 as a filtrate reducer, graphite as a lubricant, and barite as a densifier.

In addition, based on the total weight of the water-based drilling fluid, the amount of the amino-terminated hyperbranched polymer that serves as a shale inhibitor may be 5 wt %, the amount of the FA-367 that serves as a coater for shale rock cuttings is 0.5 wt %, the amount of the SPNH is 5 wt %, the amount of the SMP-1 that serves as a filtrate reducer is 5 wt %, the amount of the graphite that serves as a lubricant is 3 wt %, and the amount of the barite that serves as a densifier is 1 wt %.

In addition, the water-based drilling fluid Z9 prepared in the Example 9 is used in shale gas extraction, and the filtrate loss is measured, as shown in Table 4.

Example 10

This example is provided to describe the water-based drilling fluid prepared with the method in the present invention.

The water-based drilling fluid comprises the amino-terminated hyperbranched polymer prepared in the example 1 as a shale inhibitor, FA-367 and SPNH as a coater for shale rock cuttings, SMP-1 as a filtrate reducer, graphite as a lubricant, and barite as a densifier.

In addition, based on the total weight of the water-based drilling fluid, the amount of the amino-terminated hyperbranched polymer that serves as a shale inhibitor may be 3 wt %, the amount of the FA-367 that serves as a coater for shale rock cuttings is 0.3 wt %, and the amount of the SPNH is 3 wt %. The amount of the SMP-1 that serves as a filtrate reducer is 3 wt %, the amount of the graphite that serves as a lubricant is 2 wt %, and the amount of the barite that serves as a densifier is 0.5 wt %.

In addition, the water-based drilling fluid Z10 prepared in the example 10 is used in shale gas extraction, and the filtrate loss is measured, as shown in Table 4.

Comparative Example 1

A water-based drilling fluid is prepared with the method described in the example 6, but the water-based drilling fluid doesn't employ the amino-terminated hyperbranched polymer provided in the present invention as a shale inhibitor. In addition, the water-based drilling fluid D1 prepared in the comparative example 1 is used in shale gas extraction, and the filtrate loss is measured, as shown in Table 4.

Comparative Example 2

A water-based drilling fluid is prepared with the method described in the example 6, but the amino-terminated hyperbranched polymer provided in the present invention, which is intended to serve as a shale inhibitor, is replaced with KCl inhibitor.

In addition, the water-based drilling fluid D2 prepared in the comparative example 2 is used in shale gas extraction, and the filtrate loss is measured, as shown in Table 4.

Comparative Example 3

A water-based drilling fluid is prepared with the method described in the example 6, but, based on the total weight of the water-based drilling fluid, the amount of the amino-terminated hyperbranched polymer provided in the present invention as a shale inhibitor is 7 wt %.

In addition, the water-based drilling fluid D3 prepared in the comparative example 3 is used in shale gas extraction, and the filtrate loss is measured as per the standard GBT16783.1-2014, as shown in Table 4.

TABLE 4

| No. | Filtrate loss within 30 min. The amino-terminated hyperbranched polymer is added Filtrate loss (mL) | Filtrate loss within 60 min. Filtrate loss (mL) |
| --- | --- | --- |
| Example 6 | 6.8 | 12.3 |
| Example 7 | 6.3 | 11.9 |
| Example 8 | 8.5 | 15.3 |
| Example 9 | 5.6 | 9.4 |
| Example 10 | 6.0 | 11.1 |
| Comparative example 1 | 10.7 | 17.9 |
| Comparative example 2 | 6.3 | 11.6 |
| Comparative example 3 | 5.4 | 10.8 |

The results indicate: the amino-terminated hyperbranched polymer prepared with the preparation method disclosed in the present invention has highly branched mesh structures and a large quantity of terminal functional groups, and is totally different from linear polymers in terms of structure and performance. The polymer can be absorbed to and wind on the surfaces of shale rocks uniformly, and there are more adsorption sites relatively. It is seen from the data in Table 4: a drilling fluid system that employs the amino-terminated hyperbranched polymer provided in the present invention as a shale inhibitor can control the filtrate loss of the drilling fluid in the drilling process very well and maintain the filtrate loss at a low level, achieving excellent performance. As indicated by the filtrate loss data, the shale hydration inhibiting capability is improved, and thereby the overall inhibition performance of the drilling fluid is improved.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A shale inhibitor, comprising: structural units A represented by formula (I), optional structural units B represented by (II) and structural units C represented by formula (VIII);

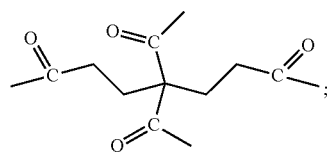
formula (I)

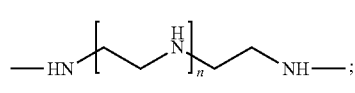
formula (II)

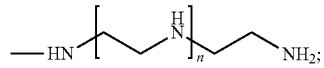
formula (VIII)

wherein n is an integer with a range of 0-3;
wherein the shale inhibitor is an amino-terminated hyperbranched polymer that has an amido bond formed by a —CO— bond in the structural unit A bonded with an —NH— bond in the structural unit B and/or structural unit C;
wherein the ratio of the structural units A to the structural units B to the structural units C is m:(m−1):(2m+2), wherein m is an integer with a range of 1-10.

2. The inhibitor according to claim 1, wherein the number-average molecular weight of the shale inhibitor is 400-1,100 g/mol.

3. The inhibitor according to claim 1, wherein n is an integer with a range of 0-2; m is an integer with a range of 1-5.

4. The inhibitor according to claim 2, wherein n is 0 or 1; m is 1 or 2.

5. A water-based drilling fluid, comprising the shale inhibitor according to claim 1.

6. A method for preparing the shale inhibitor according to claim 1, comprising:
(1) mixing monomer A and monomer B an organic solvent, wherein A and B have a Michael bis-addition reaction to form a reaction product;
(2) recrystallizing the reaction product obtained in the step (1) to obtain a product C;
(3) polymerizing product C with monomer D in an alcohol solvent;
wherein the monomer A has a structure represented by formula (III), the monomer B has a structure represented by formula (IV), the product C has a structure represented by formula (V), and the monomer D has a structure represented by formula (VI);

formula (III)

formula (IV)

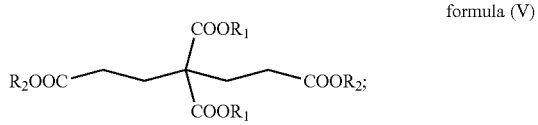
formula (V)

formula (VI)

wherein $R_1$ and $R_2$ may be the same or different, and may be $C_1$-$C_4$ substituted or unsubstituted alkyl respectively and independently.

7. The method according to claim 6, wherein a catalyst selected from potassium carbonate and tetrabutylammoniumbromide, is added in step (1), and the molar ratio of potassium carbonate to tetrabutylammonium bromide is 1:(0.015-0.03).

8. The method according to claim 7, wherein in step (1), the organic solvent is selected from n-hexane, n-heptane, and petroleum ether; with respect to 100 ml organic solvent, the amount of the monomer A is 0.1-0.3 mol, the amount of the monomer B is 0.2-0.4 mol, and the amount of the potassium carbonate is 0.2-0.4 mol.

9. The method according to claim 6, wherein in step (2), the conditions of the first recrystallization include: at 50-60° C. temperature, the reaction product of the addition reaction is dissolved in ethyl acetate for 10-20 min., then the obtained mixture is filtered by suction filtration, the filtrate is cooled to room temperature, and the first recrystallization is executed for 25-35 min., and finally the product C is obtained by suction filtration.

10. The method according to claim 6, wherein in step (3), the alcohol solvent is methanol; with respect to 100 ml alcohol solvent, the amount of the monomer D is 0.04-0.08 mol; the molar ratio of the product C to the monomer D is 1:(3-5).

11. The method according to claim 6, wherein step (3) comprises:
(1) adding an alcoholic solution of product C by dropwise adding at a rate of 0.05-0.1 ml/s into the monomer D to have a prepolymerization reaction; and
(2) treating a reaction product obtained through the prepolymerization reaction by vacuum extraction and rotary evaporation.

12. The method according to claim 11, further comprising recrystallizing the product obtained through the polymerization reaction.

13. The method according to claim 6, wherein $R_1$ is methyl or ethyl, and $R_2$ is methyl, ethyl, n-propyl, isopropyl or butyl.

14. The method according to claim 8, wherein the monomer B is added at a rate of 0.05-0.1 ml/s into an organic solution of the monomer A.

15. The method according to claim 14, wherein the conditions of the Michael bis-addition reaction include: temperature: 50-70° C.; time: 11-13 h.

16. The method according to claim 11, wherein, the conditions of the rotary evaporation include: vacuum degree: −0.07 MPa; temperature: 70-80° C.; time: 2-4 h.

17. The method according to claim 16, wherein the conditions of the polymerization reaction include: temperature: 40-50° C.; time: 2-5 h.

18. The method according to claim 12, wherein the conditions of the second recrystallization include: at 40-50° C. temperature, the product obtained through the polymerization reaction is dissolved in ethyl acetate for 10-20 min., then the resultant mixture is filtered by suction filtration, the filtrate is cooled to room temperature, and then the second recrystallization is executed for 0.5-1 h.

* * * * *